United States Patent

Fujiwara et al.

[11] Patent Number: 5,866,655
[45] Date of Patent: Feb. 2, 1999

[54] VINYL ALCOHOL POLYMER

[75] Inventors: Naoki Fujiwara; Takeshi Kusudou, both of Kurashiki; Takaharu Kawahara, Okayama; Toshiaki Sato, Kurashiki, all of Japan

[73] Assignee: Kuraray Co., Ltd., Kurashiki, Japan

[21] Appl. No.: 864,738

[22] Filed: May 28, 1997

Related U.S. Application Data

[63] Continuation of Ser. No. 600,933, filed as PCT/JP95/01096, Jun. 5, 1995, abandoned.

[51] Int. Cl.$^6$ ..................................................... C08F 16/06
[52] U.S. Cl. .............................. 525/60; 526/319; 526/330
[58] Field of Search ............................... 525/60; 526/319, 526/330

[56] References Cited

U.S. PATENT DOCUMENTS

| | | | |
|---|---|---|---|
| 3,313,789 | 4/1967 | Naarmann et al. | 260/80.5 |
| 3,441,547 | 4/1969 | Lindemann | 526/330 X |
| 3,471,459 | 10/1969 | Waples | 260/88.1 |
| 3,619,346 | 11/1971 | Sandler | 161/251 |
| 3,664,988 | 5/1972 | Trieschmann et al. | 526/330 X |
| 4,851,465 | 7/1989 | Yamakawa et al. | 524/431 |

FOREIGN PATENT DOCUMENTS 2 126 357  12/1972  Germany.

*Primary Examiner*—Judy M. Reddick
*Attorney, Agent, or Firm*—Oblon, Spivak, McClelland, Maier & Neustadt, P.C.

[57] ABSTRACT

A vinyl alcohol polymer with a side chain being a hydroxyalkyl group having 2 to 20 carbon atoms is disclosed. Conventional water-soluble vinyl alcohol polymers gives, where they have a high interfacial activity, an aqueous solution with much-foaming and hence a problem when used for commercial purposes. On the other hand, the vinyl alcohol polymer of the present invention gives, where it is water-soluble, an aqueous solution with less-foaming in spite of its high interfacial activity, and hence an excellent industrial applicability. The vinyl alcohol polymer of the present invention is useful as thermoplastic resin and dispersion stabilizer. In addition, the vinyl alcohol polymer of the present invention is usable for various purposes, e.g. surfactants for various uses, paper coating agent, quality-improving agent for paper such as paper ingredients and pigment binders, adhesive for wood, paper, aluminum foil and inorganic materials, binder for nonwoven fabric, paint, warp sizing agent, fiber-processingagent, sizing agent for hydrophobic fibers such as polyester fiber, various films and sheets, bottles and fibers.

8 Claims, No Drawings

VINYL ALCOHOL POLYMER

This application is a continuation of application Ser. No. 08/600,933, filed on Feb. 29, 1996, abandoned, which was filed as International PCT application PCT/JP95/01096 filed Jun. 5,1995.

TECHNICAL FIELD

The present invention relates to a vinyl alcohol polymer having a good thermal stability.

BACKGROUND ART

Polyvinyl alcohol (hereinafter referred to as "PVA") is known as a representative vinyl alcohol polymer, which has vinyl alcohol units in the molecule thereof. PVA is excellent in film formability, transparency and strength and hence has been widely used as quality-improving agent for paper, e.g. coating agent and additive for paper; adhesive for paper, wood, inorganic materials and the like; sizing agent for warp; films, sheets and the like. Conventional PVAs are classified into "fully hydrolyzed PVA" having a degree of hydrolysis of about 98 mole % and "partially hydrolyzed PVA" having a degree of hydrolysis of about 88 mole %.

These conventional PVAs have been used in the form of aqueous solution because they are insufficient in thermal stability. Hence, fully hydrolyzed PVA with its melting point being very close to its thermal decomposition temperature cannot be hot-melt molded. On the other hand, partially hydrolyzed PVA, which has a lower melting point as compared with fully hydrolyzed PVA, has a poor thermal stability and hence produces acetic acid odor during hot-melt molding.

There have been proposed processes for hot-melt molding of PVA, which comprise decreasing the melt viscosity of PVA by blending therewith a plasticizer or another polymer. However, in the case of the method of addition of a plasticizer in the molded articles, the content of the plasticizer decreases with time when the molded articles are used for a long period of time. As a result, the molded articles become insufficient in flexibility thereby causing splits or cracks under low temperature and low humidity conditions as in winter. On the other hand, the method of blending PVA with another polymer gives molded articles with very poor mechanical properties or transparency, since compatibility of each polymer is insufficient.

Alternatively, modification of PVA has been proposed to lower the melting point of PVA.

However, PVA with (ω-hydroxyalkyl vinyl ether units and an alkyl vinyl ether units (Japanese Patent Publication No. 10885/1992) and PVA with polyoxyethylene monoallyl ether units (Japanese Patent Publication No. 49683/1993) have a problem of poor thermal stability because of their ether bonds. PVA with allyl alcohol units (Japanese Patent Application Laid-open No. 229135/1987) has a problem that its thermal stability is still insufficient for practical purposes although its thermal stability is improved to some extent and has a problem of the allyl alcohol remaining in the PVA with regard to safety. PVA with α-olefin units (Japanese Patent Application Laid-open No. 289581/1988) has an extraordinary high melt viscosity and is water-insoluble, due to association of hydrophobic groups.

DISCLOSURE OF THE INVENTION

Accordingly, an object of the present invention is to provide a novel vinyl alcohol polymer having an excellent thermal stability.

Another object of the present invention is to provide a novel vinyl alcohol polymer which gives an aqueous solution with less-foaming, although having a high interfacial activity in the case of said PVA being water-soluble.

As a result of intensive studies to solve the above problems, the present inventors have found a vinyl alcohol polymer comprising a side chain of a hydroxyalkyl group having 2 to 20 carbon atoms, to complete the invention.

The vinyl alcohol polymer of the present invention should have vinyl alcohol units in the molecule thereof.

The side chain of the vinyl alcohol polymer of the present invention is a hydroxyalkyl group having 2 to 20 carbon atoms and said side chain should be directly bonded to the main chain of the vinyl alcohol polymer The number of carbon atoms of the hydroxyalkyl group of the vinyl alcohol polymer of the present invention is 2 to 20, and preferably 2 to 15, more preferably 3 to 10. The hydroxyalkyl group is an alkyl group having at least one hydroxyl group, among which ω-hydroxyalkyl group is preferred in view of thermal stability and water-solubility. The alkyl group of the hydroxyalkyl group may be one in which a hydorogen is substituted with a linear or branched alkyl group having 1 to 9 carbon atoms.

Examples of monomer units with a hydroxyalkyl group having 2 to 20 carbon atoms chain are hydroxyl group-containing olefin units. From the viewpoint of easiness of controlling the degree of polymerization of the vinyl alcohol polymer and easiness of controlling the content of the hydroxyalkyl group- containing monomer units, among said monomer units, there can be preferred 3-buten-1-ol, 4-penten-1-ol, 5-hexen-1-ol, 7-octen-1-ol, 9-decen-1-ol, 11-dodecen-l-ol, 3-methyl-3-buten-1-ol and the like. Besides these monomer units, there can also beused monomer units containing an ester group that can produce a hydroxylgroup when the vinyl ester polymer is hydrolyzed to produce the vinyl alcohol polymer.

Although there are no particular restrictions with respect to the content of the hydroxyalkyl group having 2 to 20 carbon atoms in the vinyl alcohol polymer of the present invention, the suitable content is as follows.

Where the vinyl alcohol polymer of the present invention is used for hot-melt molding, the content of the hydroxyalkyl group is preferably in a range of 0.1 to 50 mole %, more preferably 1 to 30 mole %.

Where the vinyl alcohol polymer of the present invention is used for the purpose of hot-melt molding and water-soluble resin, the content of the hydroxyalkyl group is preferably in a range of 0.3 to 30 mole %, more preferably 0.5 to 20 mole %.

Where the vinyl alcohol polymer of the present invention is used as a dispersion stabilizer for emulsion polymerization of a vinyl ester monomer and the like, the content of the hydroxyalkyl group is preferably in a range of 0.1 to 25 mole %, more preferably 0.3 to 15 mole %.

In the case of the content of the hydroxyalkyl group being less than 0.1 mole %, thermal stability, hot-melt moldability and interfacial activity are not sufficiently improved. On the other hand, in the case of the content exceeding 30 mole %, water-solubility decreases; and in the case of the content exceeding 50 mole %, the characteristics inherent to a vinyl alcohol polymer become worse.

There are no specific limitations to the degree of hydrolysis of the vinyl alcohol polymer of the present invention and either complete hydrolysis or partial hydrolysis will do. However, in view of thermal stability and hot-melt moldability, the degree of hydrolysis is preferably at least 50 mole %, more preferably at least 70 mole %, most preferably at least 80 mole %.

The viscosity average degree of polymerization (hereinafter referred to simply as "degree of polymerization") of the vinyl alcohol polymer of the present invention is preferably 100 to 20,000, more preferably 200 to 8,000 and most preferably 300 to 5,000. In the case of the degree of polymerization being less than 100, the characteristics inherent to the vinyl alcohol polymer become worse. On the other hand, in the case of the degree of polymerization exceeding 20,000, it is difficult to produce the vinyl alcohol polymer on a commercial scale.

The vinyl alcohol polymer of the present invention can be produced by any of the known methods including one which comprises copolymerizing a vinyl ester and a hydroxyalkyl group-containing olefin and then hydrolyzing the obtained vinyl ester polymer in a solution of an alcohol or dimethyl sulfoxide.

Examples of the vinyl esters are vinyl formate, vinyl acetate, vinyl propionate and vinyl pivalate, among which vinyl acetate is preferred.

The vinyl alcohol polymer of the present invention may be copolymerized with an ethylenically unsaturated monomer within a limit not to impair the effect of the present invention.

Examples of the ethylenically unsaturated monomers are olefins, e.g. ethylene, propylene, 1-butene and isobutene; unsaturated acids, e.g. acrylic acid, methacrylic acid, crotonic acid, phthalic acid or phthalic anhydride, maleic acid or maleic anhydride, itaconic acid or itaconic anhydride, and salts or mono- or di- alkyl ester having 1 to 18 carbon atoms; acrylamides, e.g. N-acrylamide having 1 to 18 carbon atoms, N,N-dimethylacrylamide, 2-acryalamidepropanesulfonic acid or salts thereof and acrylamidepropyldimethylamine or acid salts or quaternary salts thereof; methacryalamide, e.g. N-methacrylamide having 1 to 18 carbon atoms, N,N-dimethylmethacrylamide, 2-methacryalamidepropanesulfonic acid or salts thereof and methacrylamidepropyldimethylamine or acid salts or quaternary salts thereof; N-vinylamides, e.g. N-vinylpyrrolidone, N-vinylformamide and N-vinylacetamide; vinyl cyanides, e.g. acrylonitrile and methacrylonitrile; vinyl ethers, e.g. alkyl vinyl ethers, hydroxyalkyl vinyl ethers and alkoxyalkyl vinyl ethers having 1 to 18 carbon atoms; vinyl halides, e.g. vinyl chloride, vinylidene chloride, vinyl fluoride, vinylidene fluoride and vinyl bromide; vinyl silanes, trimethoxyvinylsilane; allyl compounds, e.g. allyl acetate, allyl chloride, allyl alcohol and dimethylallyl alcohol; trimethyl-(3-acrylamide-3-dimethylpropyl)-ammonium chloride and acryalamide-2-methylpropanesulfonic acid.

The vinyl alcohol polymer of the present invention includes a terminal-modified one obtained by copolymerizing a vinyl ester monomer such as vinyl acetate with a hydroxyalkyl group-containing olefin in the presence of a thiol such as thioacetic acid or mercaptopropionic acid, and then hydrolyzing the obtained copolymer.

Examples of the process of copolymerizing a vinyl ester and a hydroxyalkyl group-containing olefin are bulk polymerization, solution polymerization, suspension polymerization, emulsion polymerization and the known processes. Among these, there is generally employed bulk polymerization or solution polymerization with a solvent such as alcohol, and, for obtaining a high degree of polymerization, emulsion polymerization is employed. Examples of alcohols usable as solvent for solution polymerization are lower alcohols such as methyl alcohol, ethyl alcohol and propyl alcohol. Examples of initiators used for the copolymerization are known azo- or peroxide-based ones, such as α, α-azo-bisiso-butyronitrile, 2,2-azobis(2,4-dimethylvaleronitrile), benzoyl peroxide and n-propyl peroxycar-bonate. Although any polymerization temperature can be employed, the temperature is suitably in a range of room temperature to 150° C.

The copolymer of a vinyl ester and a hydroxylalkyl group-containing olefin is hydrolyzed while being dissolved in an alcohol or, in some cases, water-containing alcohol. Lower alcohols such as methyl alcohol and ethyl alcohol and the like are usable for this purpose, and methyl alcohol is particularly preferred. The alcohol used for the hydrolysis may contain not more than 40% by weight of a solvent such as acetone, methyl acetate, ethyl acetate, benzene and the like. Examples of catalysts usable for the hydorlysis are alkali metal hydroxides such as potassium hydroxide and sodium hydroxide, alkali catalysts such as sodium methylate and acid catalysts such as mineral acids. Although there are no particular limitations to the temperature used for the hydrolysis, it is suitably in a range of 20° to 60° C. When, in the course of the hydrolysis, a gel-like product precipitates, the product is taken out, pulverized, washed and dried, to give the vinyl alcohol polymer of the present invention.

The vinyl alcohol polymers of the present invention have has an extremely excellent thermal stability as compared with conventional PVAs That is, in the case of the vinyl alcohol polymer of the present invention, the temperature of an index of thermal stability at which the weight of the polymer decreases 5% by weight (hereinafter referred to as "5% weight reduction temperature"; see Examples) is higher than 300° C. While thermoplastic resins such as polyolefins are hot-melt molded at a temperature of not more than 250° C. on a commercial scale, in view of long-run operability, the actual hot-melt molding temperature has to be set at a temperature of at least 50° C. lower than the 5% weight reduction temperature. Therefore the vinyl alcohol polymer of the present invention having a 5% weight reduction temperature of higher than 300° C. can be said to have an excellent hot-melt moldability on a commercial scale. The vinyl alcohol polymer of the present invention still has a good thermal stability and, in particular, can be melt moldable at a high temperature also in the case of low degree of hydrolysis or partially hydrolyzed PVA.

Although the mechanism of the vinyl alcohol polymer of the present invention exhibiting an excellent thermal stability is not quite clear, it is attributable to the side chains (hydroxyalkyl groups having 2 to 20 carbon atoms) bonded directly to the main chain of the vinyl alcohol polymer.

The vinyl alcohol polymer of the present invention may, in order to further improve the thermal stability, incorporate plasticizers. Examples of plasticizers usable for this purpose are, but not limited thereto, glycols, e.g. ethylene glycol, diethylene glycol, triethylene glycol, tetraethylene glycol, polyethylene glycol having a molecular weight of not more than 600, trimethylene glycol, tetramethylene glycol, pentamethylene glycol, hexamethylene glycol and propylene glycol; glycerine; diols, e.g. 1,3-butanediol and 2,3-butanediol; trimethylolpropane; di-glycerine; 3-methyl-,3,5-pentatriol, a small amount of water and the like. It is desirable to add a plasticizer in an amount of not more than 30 parts by weight and more preferably not more than 20 parts by weight, particularly not more than 10parts by weight based on 100 parts by weight of the vinyl alcohol polymer.

The vinyl alcohol polymers of the present invention can be used in the form of a mixture with inorganic materials having a low reactivity therewith, such as clays, inorganic salts and glass. Examples of the inorganic materials are kaolin, clay, talc, acid clay, silica, alumina, diatomaceous earth, bentonite, montmorillonite, kibushi clay, gaerome clay, agalmatolite, alunite, chinaearth, feldspar, asbestos, pearlite, calcium carbonate, magnesium hydroxide, carbon black, titanium oxide, mica, shirasu, glass, glass fibers and the like. Inorganic materials usable in the present invention can have any average particle diameter, but prferably 0.1 to 100 μm.

These inorganic materials can be added preferably in an amount of not more than 2,000 parts by weight, more preferably not more than 1,000 parts by weight based on 100 parts by weight of vinyl alcohol polymer.

The vinyl alcohol polymer of the present invention can be molded, for example, molding from the form of a solution in a solvent such as water or dimethyl sulfoxide; molding by being plasticized by heating (e.g. extrusion molding, injection molding, tubular film formation, pressing and blow molding). These processes give molded articles having any optional shape such as film, sheet, tube and bottle.

Where the vinyl alcohol polymer of the present invention is water-soluble, its aqueous solution has a less-foaming property, in spite of the polymer having an extremely excellent high interfacial activity. This is attributable, though not quite clear, to the side chains (hydroxyalkyl groups having 2 to 20 carbon atoms) directly bonded to the main chain.

The vinyl alcohol polymer of the present invention having an extermely excellent high interfacial activity and a less-foaming property when dissolved in water is useful as dispersion stabilizer, coating agent, sizing agent, binder and the like.

Hereinbelow, the present invention is described in detail by Examples and Comparative Examples. In the Examples and Comparative Examples that follow, "parts" and "%" mean "parts by weight" and "% by weight" unless otherwise specified.

The contents of side-chain hydroxyalkyl group, vinyl ester units, vinyl alcohol units and other comonomer units in a vinyl alcohol polymer were determined by 270 MHz $^1$H-NMR analysis. Deuterated DMSO was used as solvent of vinyl alcohol polymer for the $^1$H-NMR analysis.

The degree of polymerization, water solubility, thermal stability, surface tension and viscosity of 4% aqueous solution of vinyl alcohol polymer were determined according to the following methods.

(1) Viscosity average degree of polymerization

PVA with a degree of hydrolysis of at least 99.5 mole % was tested for intrinsic viscosity [η] (g/dl) and the viscosity average degree of polymerization (P) was calculated by the the following equation, after PVA was hydrolyzed to a degree of hydrolysis of at least 99.5 mole % in the case of a degree of hydrolysis being less than 99.5%.

$$P=([\eta]\times 10^3 /8.29)^{(1/0.62)}$$

(2) Water solubility

An Aqueous solution with a concentration of 10% was prepared, and the solution was observed visually. The result is shown in terms of the following rating.

○: soluble in water
X : insoluble in water (3) Thermal stability

Purified PVA obtained by vacuum-dried at 105° C. for at least 5 hours was tested by TG-DTA (differential thermal analysis) under an atmosphere of nitrogen and under the conditions of elevating the temperature at a rate of 10° C./min to 700° C., to obtain a 5% weight reduction temperature.

(4) Surface tension 0.3% aqueous solution of PVA was prepared and the solution was allowed to stand at 20° C. for 60 minutes. And the solution was tested for surface tension by Wilhemly s method (plate method).

(5) Viscosity of 4% aqueous solution

4% aqueous solution of PVA at 20° C. was prepared and the solution was tested for Type-B viscosity (Brookfield viscosity).

(6) Foaming property of aqueous solution

4% aqueous solution of PVA at 20° C. was prepared. A glass tube (inner diameter: 4.5 cm, height: 150 cm) was set vertically, and it was charged with the solution to a depth of 20 cm. The solution was circulated by pump (withdrawn from the bottom of the tube and returned to the top of the tube) at a rate of 1.5 liter/min for 15 minutes. Thereafter, the height of generated foam was measured. The result is shown in terms of the following rating.

⊚: the height of generated foam being not more than 49 cm
○: the height of generated foam being 50 to 74 cm
Δ: the height of generated foam being 75 to 99 cm
X : the height of generated foam being at least 100 cm

EXAMPLE 1

3-liter polymerization vessel equipped with a reflux condenser, stirrer, thermometer, nitrogen inlet port and feed port for post-addition was charged with 1,680 g of vinyl acetate, 350 g of 7-octen-1-ol and 420 g of methanol. The mixture was heated with stirring and under nitrogen flow. When the temperature reached a constant temperature of 60° C., 26 g of 2,2-azobisisobutyronitrile (hereinafter referred to as "AIBN") was added to initiate polymerization. The polymerization was continued while the solid concentration in the vessel was being analyzed from time to time, and terminated after 4 hours by cooling the vessel. The conversion just before the termination was 59%. The polymer paste obtained was added dropwise to n-hexane, to precipitate a polymer. The polymer was subjected three times to a reprecipitation-purification procedure which comprised dissolving in acetone and reprecipitating in n-hexane. The polymer was then dissolved in acetone again and the solution was added dropwise to distilled water. The polymer was purified by boiling and dried, to yield a purified polyvinyl acetate (hereinafter referred to as "PVAc"). A solution of the purified PVAc with a concentration of 30% in methanol was prepared. To the solution, which was being stirred at 40° C., a sodium hydroxide solution with a concentration of 10% in methanol was added (molar ratio to PVAc: 0.10), to conduct hydrolysis for 60 minutes. The gel-like matter obtained was pulverized and then immersed in methanol. To the mixture a sodium hydroxide solution with a concentration of 10% in methanol was added (molar ratio to PVAc: 0.02), to conduct further hydrolysis for 5 hours. The PVA thus obtained was washed with methanol and dried at 50° C. for 18 hours, to yield white powder of PVA. The PVA obtained had a content of 7-octen-1-ol units of 4.5 mole %. Tables 2 and 3 show the basic structure and properties of the PVA.

EXAMPLE 2

5-liter polymerization vessel was used and, in the same manner as in Example 1, polymerization was conducted as follows. There were charged 2,800 g of vinyl acetate, 300 g of 7-octen-1-ol and 700 g of methanol. The mixture was heated with stirring and under nitrogen flow. When the temperature reached a constant temperature of 60° C. , 33g of AIBN was added to initiate polymerization. The polymerization was terminated after 4.5 hours when the conversion reached 63%. A purified PVAc was obtained and then hydrolyzed and purified, in the same manner as in Example 1, to yield a purified PVA. The PVA obtained had a content of 7-octen-1-ol units of 8.4 mole %. Tables 2 and 3 show the basic structure and properties of the PVA.

EXAMPLES 3 through 8

Polymerization, hydrolysis and purification were conducted in the same manner as in Example 1 except that the polymerization conditions were changed to those shown in Table 1, to obtain purified PVAs. Tables 2 and 3 show the basic structure and properties of the PVAs.

EXAMPLE 9

5-liter polymerization was used and, in the same manner as in Example 2, polymerization was conducted as follows. There were charged 2,800 g of vinyl acetate, 800 g of 7-octen-1-ol and 30 g of sodium allylsulfonate. The mixture was heated with stirring and under nitrogen flow. When the temperature reached a constant temperature of 60° C., 30 g of AIBN was added to initiate polymerization. The polymerization was terminated after 5 hours when the conversion reached 38%. A purified PVAc was obtained and then hydrolyzed and purified, in the same manner as in Example 1, to yield a purified PVA. The PVA obtained had a content of 7-octen-1-ol units of 11.0 mole % and sodium allylsulfonate units of 0.5 mole % . Tables 2 and 3 show the basic structure and properties of the PVA.

EXAMPLE 10

To the PVAc containing 10.2 mole % of 5-hexen-1-ol units being obtained in Example 4, sodium hydroxide solution with a concentration of 10% in methanol was added (molar ratio to PVAc: 0.009), to conduct hydrolysis. The gel-like matter obtained was pulverized, then washed with methanol, and dried at 50° C. for 18 hours, to yield white powder of PVA. Tables 2 and 3 show the basic structure and properties of the PVA.

EXAMPLE 11

To the PVAc containing 4.5 mole % of 7-octen-1-ol units being obtained in Example 1, sodium hydroxide solution with a concentration of 10% in methanol was added (molar ratio to PVAc: 0.009), to conduct hydrolysis. The gel-like matter obtained was pulverized, then washed with methanol, and dried at 50° C. for 18 hours, to yield white powder of PVA. Tables 2 and 3 show the basic structure and properties of the PVA.

TABLE 1

| | Polymerization conditions | | | | | | |
|---|---|---|---|---|---|---|---|
| | Vinyl acetate (g) | Hydroxyalkyl group-containing monomer | (g) | Comonomer (g) | Methanol (g) | AIBN (g) | Polymerization time (hr) | Conversion (%) |
| Example 3 | 930 | 3-buten-1-ol | 180 | 0 | 0 | 26 | 5.0 | 32 |
| Example 4 | 930 | 5-hexen-1-ol | 105 | 0 | 0 | 9 | 6.0 | 24 |
| Example 5 | 2,800 | 7-octen-1-ol | 60 | 0 | 0 | 2.8 | 4.5 | 40 |
| Example 6 | 2,800 | 3-buten-1-o1 | 108 | 0 | 700 | 28 | 5.5 | 60 |
| Example 7 | 2,800 | 5-hexene-1,2-diol | 170 | 0 | 700 | 29 | 4.2 | 54 |
| Example 8 | 1,680 | 7-octen-1-acetate | 370 | 0 | 420 | 24 | 3.9 | 62 |

TABLE 2

| | Structure of PVA | | | | | | |
|---|---|---|---|---|---|---|---|
| | Vinyl acetate units (mole %) | Vinyl alcohol units (mole %) | Hydroxyalkyl group-containing monomer units | (mole %) | Comonomer units (mole %) | Degree of polymerization | Degree of hydrolysis (mole %) |
| Example 1 | 0.4 | 95.1 | 7-octen-1-ol | 4.5 | 0 | 590 | 99.6 |
| Example 2 | 0.5 | 91.1 | 7-octen-1-ol | 8.4 | 0 | 510 | 99.5 |
| Example 3 | 0.7 | 71.6 | 3-buten-1-ol | 27.7 | 0 | 1,500 | 99.0 |
| Example 4 | 0.6 | 89.2 | 5-hexen-1-ol | 10.2 | 0 | 1,560 | 99.3 |
| Example 5 | 0.5 | 97.9 | 7-octen-1-ol | 1.6 | 0 | 1,740 | 99.5 |
| Example 6 | 0.5 | 93.9 | 3-buten-1-ol | 5.6 | 0 | 550 | 99.5 |
| Example 7 | 0.5 | 94.6 | 5-hexene-1,2-diol | 4.9 | 0 | 710 | 99.5 |
| Example 8 | 0.1 | 95.3 | 7-octen-1-acetate | 4.6 | 0 | 640 | 99.9 |
| Example 9 | 0.3 | 88.2 | 7-octen-1-ol | 11.0 | SAS[1] 0.5 | 480 | 99.7 |
| Example 10 | 10.6 | 79.2 | 5-hexen-1-ol | 10.2 | 0 | 1,560 | 88.2 |
| Example 11 | 10.1 | 85.4 | 7-octen-1-ol | 4.5 | 0 | 590 | 89.4 |

[1]SAS: sodium allylsulfonate

TABLE 3

| | Properties of PVA | | | | |
|---|---|---|---|---|---|
| | Water-solubility | Thermal stability (°C.) | Surface tension (dyne/cm) | Viscosity of aqueous solution (mPa · s) | foaming property of aqueous solution |
| Example 1 | ○ | 350 | 54.0 | 6.5 | ⊚ |
| Example 2 | ○ | 360 | 51.4 | 6.1 | ⊚ |
| Example 3 | ○ | 350 | 60.1 | 26.9 | ⊚ |
| Example 4 | ○ | 355 | 54.9 | 29.3 | ⊚ |
| Example 5 | ○ | 345 | 56.5 | 30.9 | ⊚ |
| Example 6 | ○ | 350 | 59.2 | 5.7 | ⊚ |
| Example 7 | ○ | 325 | 51.1 | 15.3 | ⊚ |
| Example 8 | ○ | 350 | 53.9 | 6.6 | ⊚ |
| Example 9 | ○ | 320 | 49.3 | 6.2 | ⊚ |
| Example 10 | ○ | 335 | 44.6 | 27.9 | ⊚ |
| Example 11 | × | 335 | —[1] | —[1] | —[1] |

[1]: Could not be tested because of water insolubility.

COMPARATIVE EXAMPLES 1 through 10

PVAs as shown in Table 4 were evaluated in the same manner as in Example 1. The results are shown in Table 5.

TABLE 4

| | Structure of PVA | | | | | | | |
|---|---|---|---|---|---|---|---|---|
| | Vinyl acetate units (mole %) | Vinyl alcohol units (mole %) | Hydroxyalkyl group containing monomer units (mole %) | Comonomer units | | (mole %) | Degree of polymerization | Degree of hydrolysis (mole %) |
| Comparative Example 1 | 1.6 | 98.4 | — | 0 | — | 0 | 510 | 98.4 |
| Comparative Example 2 | 26.9 | 73.1 | — | 0 | — | 0 | 490 | 73.1 |
| Comparative Example 3 | 11.7 | 88.3 | — | 0 | — | 0 | 1,740 | 88.3 |
| Comparative Example 4 | 1.3 | 97.8 | — | 0 | HBVE[1] 0.6 SVE[2] | 0.3 | 1,400 | 98.7 |
| Comparative Example 5 | 0.5 | 94.8 | — | 0 | Allyl alcohol | 4.7 | 570 | 99.5 |
| Comparative Example 6 | 13.4 | 86.1 | — | 0 | 1-Dodecene | 1.0 | 1,800[5] | 85.5 |
| Comparative Example 7 | 0.5 | 98.6 | — | 0 | POE[3] | 0.9 | 1,040 | 99.5 |
| Comparative Example 8 | 0.5 | 97.5 | — | 0 | Itaconic acid | 2.0 | 1,640 | 99.5 |
| Comparative Example 9 | 11.3 | 88.2 | — | 0 | SAS[4] | 0.5 | 520 | 88.6 |
| Comparative Example 10 | 1.0 | 96.0 | — | 0 | Vinyl versatate | 3.0 | 1,750[5] | 99.0 |

[1]HBVE: ω-hydroxybutyl vinyl ether
[2]SVE: stearyl vinyl ether
[3]POE: polyoxyethylene (n = 9) monoallyl ether
[4]SAS: sodium allylsulfonate
[5]Obtained from the intrinsic viscosity of a solution in acetone at 30° C. of PVAc obtained by reacetylation of PVA because PVA is water-insoluble

TABLE 5

| | Properties of PVA | | | | |
|---|---|---|---|---|---|
| | Water-solubility | Thermal stability (°C.) | Surface tension (dyne/cm) | Viscosity of aqueous solution (mPa · s) | foaming property of aqueous solution |
| Comparative Example 1 | ○ | 260 | 63.1 | 5.5 | ⊚ |

TABLE 5-continued

| | Properties of PVA | | | | |
|---|---|---|---|---|---|
| | Water-solubility | Thermal stability (°C.) | Surface tension (dyne/cm) | Viscosity of aqueous solution (mPa · s) | foaming property of aqueous solution |
| Comparative Example 2 | ○ | 220 | 42.6 | 4.6 | Δ |
| Comparative Example 3 | ○ | 240 | 54.9 | 22.4 | × |
| Comparative Example 4 | ○ | 250 | 57.5 | 2,700 | × |
| Comparative Example 5 | ○ | 280 | 61.8 | 2.8 | ○ |
| Comparative Example 6 | × | 290 | —[1] | —[1] | —[1] |
| Comparative Example 7 | ○ | 240 | 63.2 | 15.4 | ○ |
| Comparative Example 8 | ○ | 210 | 64.4 | 24.9 | ○ |
| Comparative Example 9 | ○ | 230 | 56.9 | 6.5 | × |
| Comparative Example 10 | × | 260 | —[1] | —[1] | —[1] |

[1]: Could not be tested because of water insolubility.

INDUSTRIAL APPLICABILITY

The vinyl alcohol polymer of the present invention has a 5% weight reduction temperature of higher than 300° C. and has an excellent thermal stability.

Conventional water-soluble vinyl alcohol polymers gives, where they have a high interfacial activity, an aqueous solution with much-foaming and hence a problem when used for commercial purposes. On the other hand, the vinyl alcohol polymer of the present invention gives, where it is water-soluble, an aqueous solution with less-foaming in spite of its high interfacial activity, and hence an excellent industrial applicability.

The vinyl alcohol polymer of the present invention is useful as thermoplastic resin and dispersion stabilizer. In addition, the vinyl alcohol polymer of the present invention is usable for various purposes, e.g. surfactants for various uses, paper coating agent, quality-improving agent for paper such as paper ingredients and pigment binders, adhesive for wood, paper, aluminum foil and inorganic materials, binder for nonwoven fabric, paint, warp sizing agent, fiber-processingagent, sizing agent for hydrophobic fibers such as polyester fiber, various films and sheets, bottles and fibers.

We claim:

1. A vinyl alcohol polymer comprising a side chain directly bonded to a main chain of said polymer, said side chain having the formula —$CH_2$—$CH_2$—R, wherein R is a hydroxyalkyl group having 1 to 8 atoms.

2. The polymer of claim 1, wherein R is hydroxymethyl.

3. The polymer of claim 1, wherein R is a hydroxyalkyl group having 2 to 8 carbon atoms.

4. The polymer of claim 1, comprising 0.1–50 mole % of said side chain.

5. The polymer of claim 1, comprising 0.3–30 mole % of said side chain.

6. The polymer of claim 1, comprising 0.1–25 mole % of said side chain.

7. The polymer of claim 1, having a degree of polymerization of 10–20,000.

8. The polymer of claim 3, wherein said hydroxyalkyl group is a ω-hydroxyalkyl group.

* * * * *